United States Patent
Bress et al.

(10) Patent No.: US 10,440,310 B1
(45) Date of Patent: Oct. 8, 2019

(54) SYSTEMS AND METHODS FOR INCREASING THE PERSISTENCE OF FORENSICALLY RELEVANT VIDEO INFORMATION ON SPACE LIMITED STORAGE MEDIA

(71) Applicants: Steven Bress, Germantown, MD (US); Mark Joseph Menz, Folsom, CA (US)

(72) Inventors: Steven Bress, Germantown, MD (US); Mark Joseph Menz, Folsom, CA (US)

(*) Notice: Subject to any disclaimer, the term of this patent is extended or adjusted under 35 U.S.C. 154(b) by 0 days.

(21) Appl. No.: 16/048,275

(22) Filed: Jul. 29, 2018

(51) Int. Cl.
    *H04N 5/92* (2006.01)
    *H04N 5/77* (2006.01)
    *H04N 5/91* (2006.01)
    *H04N 7/18* (2006.01)
    *H04N 5/84* (2006.01)
    *G06K 9/00* (2006.01)

(52) U.S. Cl.
    CPC .............. *H04N 5/772* (2013.01); *H04N 5/91* (2013.01); *H04N 7/183* (2013.01); *G06K 9/00221* (2013.01); *G06K 9/00771* (2013.01)

(58) Field of Classification Search
    CPC .......... H04N 5/772; H04N 5/91; H04N 7/183; G06K 9/00771; G06K 9/00221
    USPC ........ 348/143; 386/210, 223, 224, 232, 248, 386/326, 335, 341
    See application file for complete search history.

(56) References Cited

U.S. PATENT DOCUMENTS

| | | | |
|---|---|---|---|
| 2013/0084053 A1* | 4/2013 | Ackermann | H04N 21/23424 386/241 |
| 2018/0041733 A1* | 2/2018 | Saptharishi | H04N 7/181 |
| 2018/0053531 A1* | 2/2018 | Wrzesinski | G11B 27/036 |

* cited by examiner

*Primary Examiner* — Robert Chevalier

(57) ABSTRACT

In one embodiment, the present invention is a place-and-forget, unattended, unmonitored digital video recording device. In this embodiment the device is positioned to video record an area of interest, such as a building site, a high crime area, a problem traffic area, a large gathering of people, etc. As the device is unmonitored, if there is no activity of interest in the area of interest, no man-hours have been used. If there is some activity of interest, such as a traffic accident, vandalism, employee theft, terrorist attack, etc. the device's hard drive can be retrieved and the video recording viewed. The device stores more data (higher quality) of recent video recordings than it does of older video recordings. In this manner the current invention can retain forensically relevant video recordings for a longer period of time than current art.

21 Claims, 7 Drawing Sheets

Recording Camera Block Diagram

SYSTEMS AND METHODS FOR INCREASING THE PERSISTENCE OF FORENSICALLY RELEVANT VIDEO INFORMATION ON SPACE LIMITED STORAGE MEDIA

BACKGROUND OF THE INVENTION

A. Field of the Invention

The present invention relates to digital surveillance recording cameras, specifically, the present invention teaches systems and methods to increase the persistence of forensically relevant information on space limited storage media.

B. Description of Related Art

Surveillance cameras are well known in the art. Any type of camera may be used for surveillance. As long as it is placed to observe an area of interest, it can make a useful record of an event.

There are a few common methods for use of surveillance cameras. The first is to have an observer watch the video coming from the camera. This is used in cases where it is imperative to have an immediate response to an incident, or perhaps avert an incident. An example of this would be the ubiquitous camera domes in casinos. A trained observer can see criminal acts as they take place and have enforcement available immediately. It is also possible for a trained observer to see actions that would lead them to suspect that a crime is about to occur, and take appropriate preventive measures.

In some cases, the human observer may be augmented by computer assisted observations. This is fairly new technology that can analyze a video stream and look for suspicious patterns of behavior. One such method is to observe a parking lot and track people as they walk. The typical pattern of movement is fairly linear from the car to the storefront. Someone looking to break into a car is likely to wander in a more erratic fashion as they try to find a good target for a crime. This path can be mapped by the computer, and an operator notified as a suspicious path is detected.

Perhaps the most common use of surveillance cameras is in the unmonitored mode. These are typically cameras that are attached to some form of recording device for playback at some later time. For the sake of this discussion, these will be referred to as "Recording Cameras." These are the types of cameras that one typically finds in banks, ATMs, and convenience stores. In the case of a crime, the recording is played back in order to determine as much information as possible as to what happened.

These Recording Cameras need some form of mass storage to store any useful amount of video. In the olden days of videotape, it was common to use a modified form of a VCR for storage. For home use, a VCR tape could hold 120 minutes of video for its best quality, and go out to 6 or 8 hours with significantly reduced quality. For the sake of usability, the tradeoff between recording time and video quality usually went toward recording time. It was simply too inconvenient to have someone replace a tape every two hours. Specialized VCRs were created to record for even longer periods of time with even lower quality. Some of these VCRs could record one or two frames of video every second instead of the thirty recorded by a standard VCR.

With additional specialized hardware, multiple different video feeds could be recorded to a VCR tape at the same time. With multiple cameras recording simultaneously, the effective amount of recording time multiplied dramatically. If four feeds were recorded to a single tape and the tape only had to be replaced once per day, that is a big usability advantage over having to replace a tape every two hours. Of course, the video quality in such a system is far less than ideal.

More modern Recording Cameras record video digitally, either to an onboard storage system or a remote recorder. Even though it is common for the term Digital Video to mean good video, that is not exactly the case. The playback of Digital Video may be more predictable than that of analog recordings, yet the same tradeoffs between quality and recording time exist for Digital Video. There is another variable as well. Even though the video may be recorded digitally, there is a difference between recording video from an analog source and a digital source.

Analog cameras are often used for convenience in wiring. Moving video from the camera over a long distance can be done with very low cost coaxial cable. This type of camera typically uses a standard composite video feed, which is extremely well known in the art and can be transmitted over long distances fairly reliably. The limitations of composite video are also well known in the art. By combining the luminance (y) and chrominance (c) signals, there is a limitation on the quality of the video recreation. This is one of the reasons that it was superseded by S-Video for local connection, which improved the picture quality by separating out the y/c signals to individual wires.

Digital video signals can require more costly and complex wiring if they have to go more than a few feet from the camera to their recording device. The type of cabling is dependent on such things as the picture resolution, frame rate, color depth, and compression. The ideal method for building a digital Recording Camera is for the camera to have its own mass storage device for recording the video. In this case, there are no complex wiring issues, and it is easy to maintain signal integrity between the imaging portion of the camera and the recording portion. There are some drawbacks regarding the use of a digital Recording Camera with built in mass storage, and these are what the present invention addresses.

The biggest limitation of a built in mass storage device is that there is never enough capacity to allow for optimal recording resolution and time. If there were enough storage for space for a week's worth of 30 frame per second video at a resolution of 640×480 pixels, there would not be nearly enough storage capacity to record Hi Definition video of 1920×1080 at the same frame rate. This trade off is expected to continue for some time into the future. It is already common for HDTV sets to support up to 120 frames per second and image sensors already exist for video far in excess of HDTV.

SUMMARY OF THE INVENTION

The present invention provides methods for overcoming the limitations imposed by a finite amount of storage space for a digital recording device. For ease of discussion and not limitation, the following description will describe the current invention in the form of a video recording system as used for surveillance purposes.

In one embodiment the present invention is a place-and-forget, unattended, unmonitored digital video recording device. In this embodiment the device is positioned to video record an area of interest, such as a building site, a high crime area, a problem traffic area, a large gathering of people, etc. As the device is unmonitored, if there is no activity of interest in the area of interest, no man-hours have been used. If there is some activity of interest, such as a traffic accident, vandalism, employee theft, terrorist attack, etc. the device's hard drive can be retrieved and the video recording viewed. The device stores more data (higher quality) of recent video recordings than it does of older video recordings.

In this manner the current invention can retain forensically relevant video recordings for a longer period of time than current art.

In general, the present invention overcomes the limitation of a finite amount of storage space on a digital Recording Camera by, automatically through presets or under user command, varying the Quality of a video stream as a function of Time. Forensically relevant portions of the video stream are stored in a higher quality than those portions that are no longer as relevant.

In another embodiment the digital video recording system creates multiple video streams of differing Quality, the data in each stream subsequently stored, automatically through presents or under user command, for different amounts of Time.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE DRAWINGS

Figure 1:
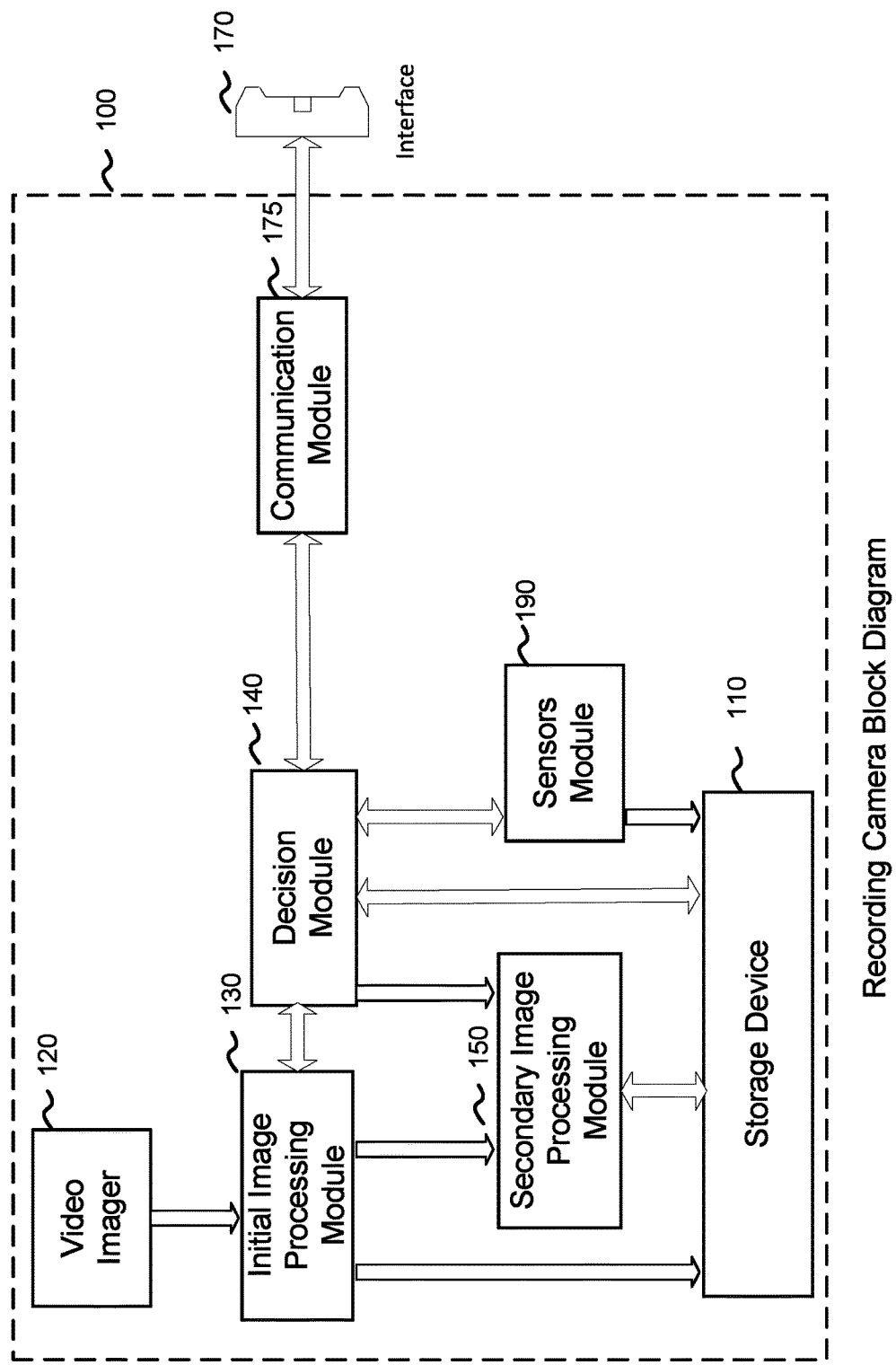
FIG. 1 is a block diagram illustrating one embodiment of a digital image recording system consistent with concepts of the invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Block Diagrams of One Embodiment of Current Invention

One embodiment of a digital video recording system 100 is described made up of a number of functional modules. The Video Imager module 120 is responsible for the imaging element and support circuitry. This circuitry may include such functions as Automatic Gain Control (AGC) or white balance. In some cameras, this module also includes features for switching from daylight optics to night vision type optics, typically by switching out the Infrared (IR) filter from in front of the imaging element.

In some cases, this module may share some features with the Initial Image Processing Module 130. There are a number of self contained modules on the market, primarily aimed at the cell phone marketplace, that contain image processing, compression and imaging in a single tiny module.

The Initial Image Processing module 130 is responsible for getting the video data out of the Video Imager 120 and performing any conversions necessary to get the data in a form ready for additional processing. This may include applying conversions from the raw data format of the imaging sensor itself to a more traditional data format such as YUV or RGB. As part of this conversion process, image processing techniques such as equalization and noise reduction may be applied to the data in order to prepare for further processing. The image processing to be performed by Module 130 is determined by the Decision Module 140. The image data may be sent directly to storage device 110. And/or it may be sent to Secondary Image Processing Module 150.

One knowledgeable in the art would recognize that there may be, or may shortly come to market Video Imager Modules with the functionality of the Initial Image Processing module as described. Furthermore, one knowledgeable in the art would recognize that in some cases it may be advantageous to record data directly from Video Module 120.

Secondary Image Processing Module 150 performs the bulk of the work of processing video. This may include data scaling, data compression and video stream preparation. The Secondary Image Processing Module may additionally create a "SuperImage". The image processing to be performed by Module 150 is determined by Decision Module 140. The image data is directed to Storage Device 110 after processing.

Sensor Module 190 is optional. In the most basic embodiment of the current invention there is not a Sensor Module. The sensor module may include sensors such as a temperature sensor 580, an ambient light sensor 520, an audio sensor 560 and associated logic and circuitry to identify characteristics of sensor data. For example, an embodiment which includes an audio sensor may also include associated logic and circuitry to determine if the audio data contains signatures of a gunshot, an explosion, police car sirens or a traffic accident. The sensor data may tag the video stream. For example in an embodiment that included a GPS Sensor 500, location data could be tagged to the video stream.

Storage Device 110 may be any sort of mass storage device such as a hard drive. In the most basic embodiment of the current invention Storage Device 110 is designed to be removed from the video recording system and accessed by another device, such as a personal computer.

Communication Module 175 is optional. In the most basic embodiment of the current invention there is not a Communication Module. In an embodiment without a Communication Module all functions of Decision Module 140 are set at time of device manufacture. The Communication Module 175 contains logic and circuitry to communicate via one or more methods including but not limited to: cell phone, USB, Ethernet, and WiFi.

Interface 170 is optional. In the most basic embodiment of the current invention there is not a Communication Module 175 and thus no need for Interfaces. In this embodiment system configuration is set during manufacture. Another embodiment would be a USB Interface 350 to allow user setting of system configuration. The Interface 170 includes one or more interfaces including but not limited to: Cell 385, USB 350, Ethernet 370 and WiFi 380.

Decision Module 140 performs a number of functions, including but not limited to: determining processing to be performed on video data, modifying data on storage device 110, responding to data from Sensor Module 190, and responding to commands from Communication Module 175. Additionally the Decision Module may perform internal checks, such as the functionality of Storage Device 110, and communicate if there is a problem.

Decision Module 140 is connected to the Initial Image Processing Module 130 and Secondary Image Processing Module 150. The Decision Module sends commands to the Initial Image Processing Module as to how the video data from the Video Imager 120 should be processed. For example: daylight processing may be different from nighttime processing. The Decision Module sends additional command(s) as to where the video stream should be directed as it leaves the Initial Image Processing Module.

Decision Module 140 monitors the state of Storage Device 110. Storage Device 110 has limited storage capability. New video data is constantly being stored on the Storage Device. Thus older data must be reduced or eliminated. There are multiple methods to reduce or eliminate the older video data. Two methods will be described below to illustrate but not limit the current invention.

In one method, two or more video streams are made from the same video data. For example, data from Initial Image Processing Module 130 may be directed to be stored on the Storage Device, and the same data additionally sent to the Secondary Image Processing Module 150. Additional processing is performed on the data to reduce the required storage space, thus producing a second video stream of lower quality. In this method, when the Decision Module determines the Storage Device needs data removed, a portion of the larger video stream (higher quality) may be eliminated and the smaller video stream (lower quality) retained. As the data continues aging some portion of the lower quality stream may be eliminated or further reduced in quality for storage in another stream.

One knowledgeable in the art would understand that digital video streams are able to be manipulated on a time basis. Thus, in the example above, the entire high quality video stream does not need to be eliminated. The least forensically relevant portions of the data would be overwritten by new data. Typically, this would be the oldest portion of the data In a second method, only one high quality video stream is initially stored on Storage Device 110. This stream may come directly from Initial Image Processing Module 130 or go through Secondary Image Processing Module 150 before being stored on Storage Device 110. In this method, when the Decision Module determines the Storage Device needs data removed, a portion of previously stored data is directed to the Secondary Image Processing Module 150 for additional processing to reduce the required storage space. This smaller, lower quality data is then stored and the original data eliminated.

A detailed explanation of this method is below. An example for clarity only, and not limitation, follows.

The term Quality of Video, includes but is not limited to, changing the bit rate of the video data (compression ratio), changing the resolution of the video frame, and changing the frame rate of the video frames. One of the unique aspects of the present invention is that the frame rate may be considered less forensically relevant than the compression ratio and the resolution of the frames. A higher quality frame may be weighted as more valuable than 20 lower quality frames.

This is quite different than the definition of video quality that is typically applied to digital video. Frame rate is generally preserved at the expense of all other considerations, except for audio. As in, for a casual viewer, slightly degraded (blurry) video is less intrusive than the stuttering of reduced frame rate video.

In the case of the current invention, one or more of the aspects of quality of video may be adjusted in order to achieve the desired data rate.

For example, to retrieve an image of a license plate from moving car, a high resolution image may be required, but a low frame rate may be acceptable.

For ease of discussion only let's say Quality equals Data Size. Thus initially the data stream is saved as highest quality which equals 100. After one week the original data may undergo additional processing which reduces its quality and data size to 50. After an additional week the stored data may be further reduced to quality and data size 25.

Decision Module 140 is connected to Sensor(s) Module 190. Based on data from the Sensor(s) Module the Decision Module may issue commands to Initial Image Processing Module 130, Secondary Image Processing Module 150, Storage Device 110 and Communication Module 175.

For example, in an embodiment that included Ambient Light Sensor 520 the Decision Module may send commands to the Initial Processing Module based on the current Ambient Light. In a similar manner the Decision Module may send commands to the Secondary Processing Module based on sensor data.

Another example would be an embodiment that included Audio Sensor 560 and said Audio Sensor had the ability to detect a traffic accident. Upon notification of a traffic accident the Decision Module could send commands to Storage Device 110 to mark the video stream before and after the traffic accident as a period of interest, and preserve that video stream as high quality. Additionally, the Decision Module could send a notification to a user of the traffic accident and/or send an automated message to a police or rescue center.

One skilled in the art would recognize that Decision Module 140 would not need a sensor to detect certain systems states, including but not limited to, loss of power to the system, or loss of video data from Video Imager 120. An example of this loss of video data would be the result of lights being turned off, or a bright light shining on the video imager.

Decision Module 140 is connected to Communication Module 175. User commands may be sent to the Decision Module through the Communication Module. The Decision Module may communicate to a user. This may be information gathered from Sensor Module 190, such as a problem with a power supply, or the detection of an event such as a traffic accident, gunshot or explosion.

Figure 7:
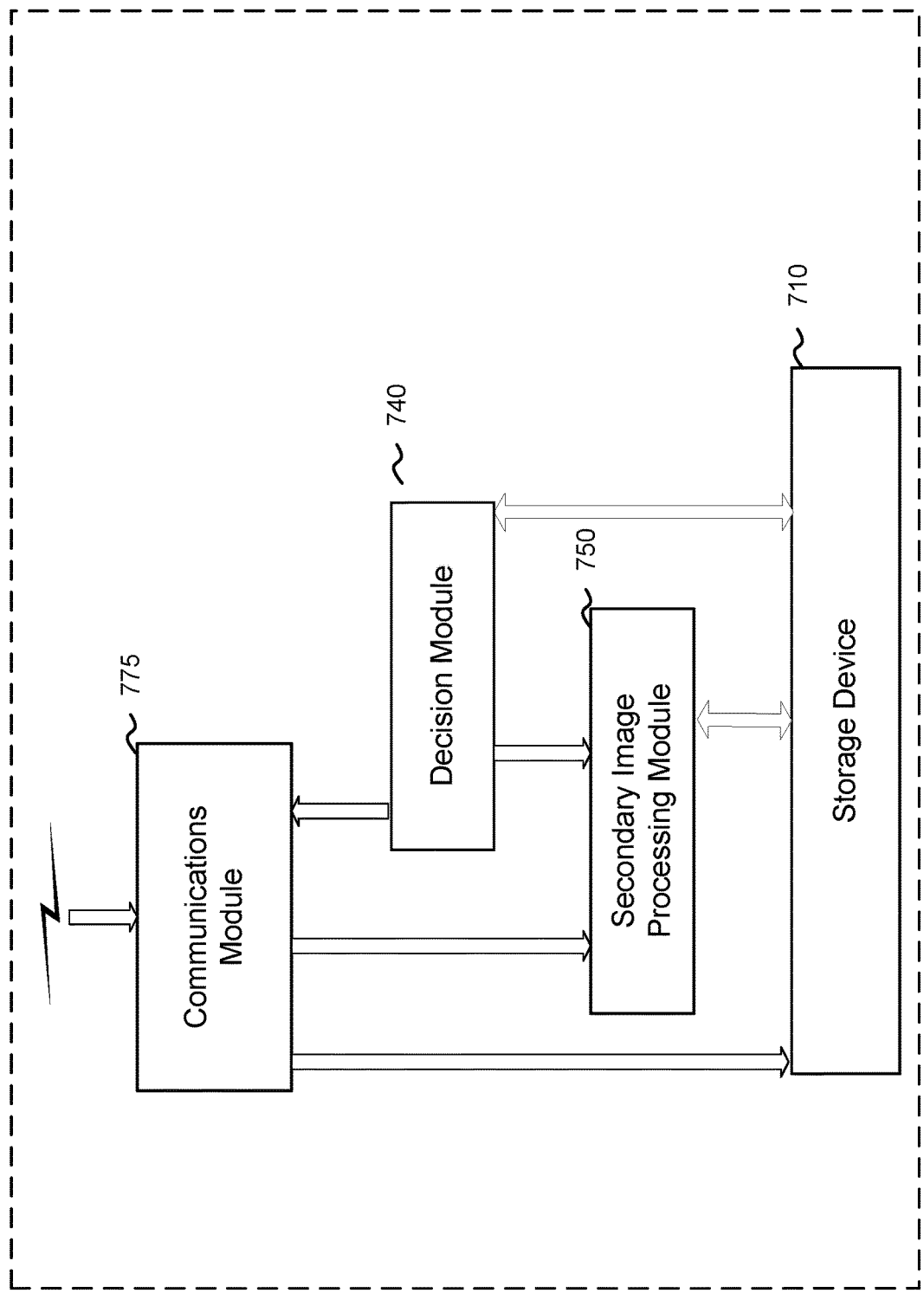
FIG. 7 is a block diagram illustrating one embodiment of an External Recording Receiver.

FIG. 7 illustrates an additional embodiment which further includes an external recording receiver 700. In this embodiment a video stream is directed from Initial Image Processing Module 130 and/or Secondary Image Processing Module to Communication Module 175. This video stream is received by Communication Module 775. The functions of Decision Module 740 are similar to Decision Module 140. The functions of Secondary Image Processing Module 750 are similar to Secondary Image Processing Module 150. The function of Storage Device 710 is similar to Storage Device 110.

Figure 4:
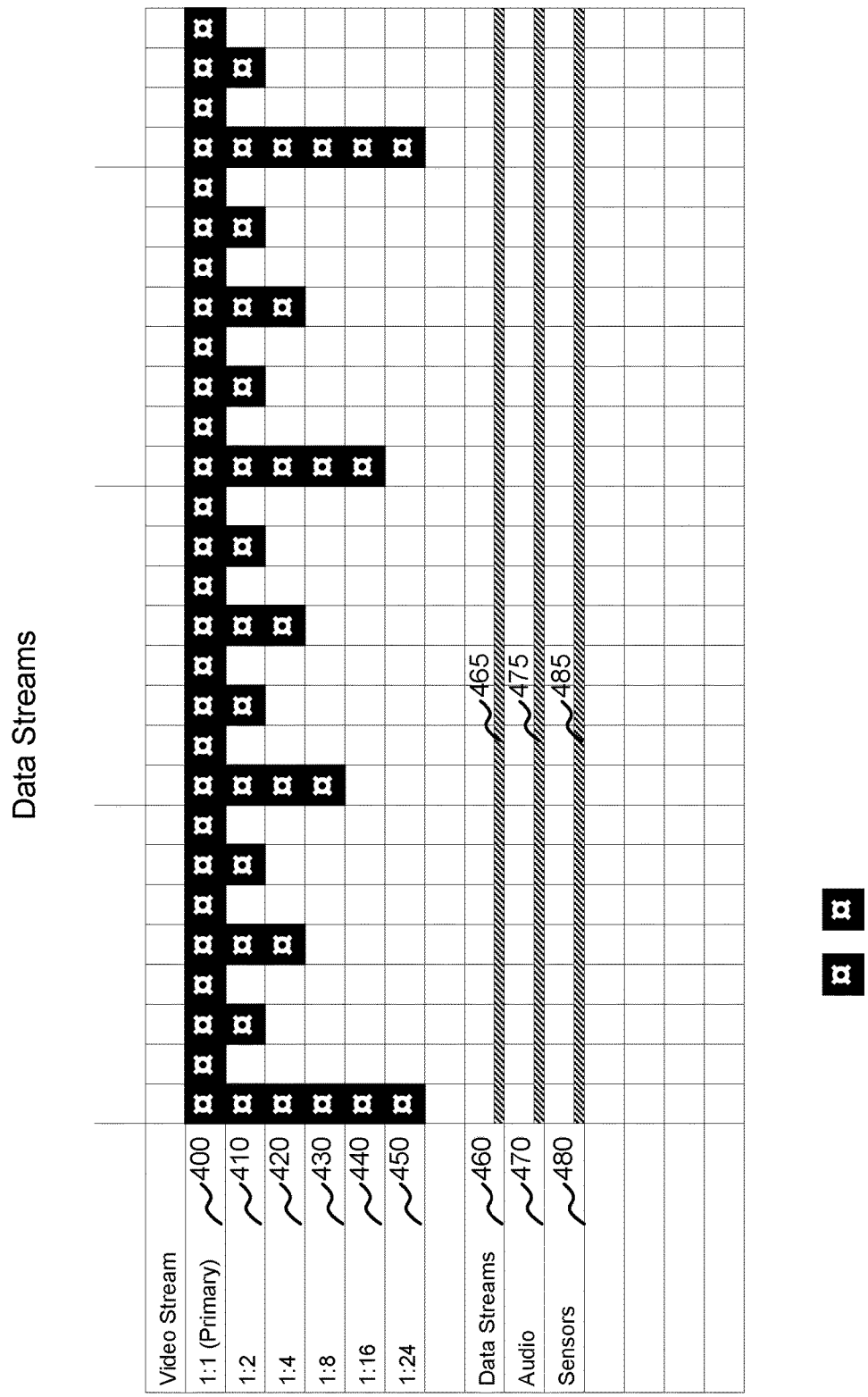
FIG. 4 is a diagram showing the relative frequency of different data streams produced by one embodiment of the present invention.

FIG. 4 Diagram of Video Streams

Please refer to FIG. 4. The present invention stores its video in one or more Video Streams. The video in the Primary Stream 400 typically is stored at the full resolution and frame rate of the system. This generally requires the most storage space and bandwidth of any of the Streams. The Stream may have a form of data compression applied to it in order to reduce the amount of bandwidth and storage space required, which ultimately will increase the amount of time that may be stored.

In addition to the Primary Stream, one or more Secondary Streams may be present. FIG. 4 graphically shows the data reduction realized in these streams by discarding some of the frames. Stream 410 requires half of the storage space of the Primary Stream for the same duration recording by discarding half of the incoming frames of video. Similarly, Stream 450 requires 1/24 the amount of storage space as the Primary Stream. This Stream delivers a little more than one frame per second at the full resolution of the system.

Also shown in FIG. 4 are additional non-video streams 460, 470, and 480. The data rates of these streams are almost always lower than video. A Stream that contains sensor information can require orders of magnitude less storage space than an equal duration Stream of video. Generally, Data streams other than video may be stored for a period of time matching the longest duration Video Stream. If Video Stream 450 had a duration of 20 days, Sensor Stream would also have a duration of 20 days.

By adjusting the number and types of Streams to be recorded, the Present Invention may be configured for an optimal blend of Primary Stream time and long duration Secondary Streams. It is reasonable for the system to simultaneously maintain multiple Video Streams. In one embodiment, the Primary Stream could store 7 days of video, another Stream could store 14 days of video at a reduced frame rate, while another stream could store 30 days worth of data at an even lower frame rate. As may be inferred from FIG. 4, 30 days worth of data at one frame per second requires the same amount of storage as a single day's worth of storage from the Primary Stream at 30 frames per second.

Figure 6:
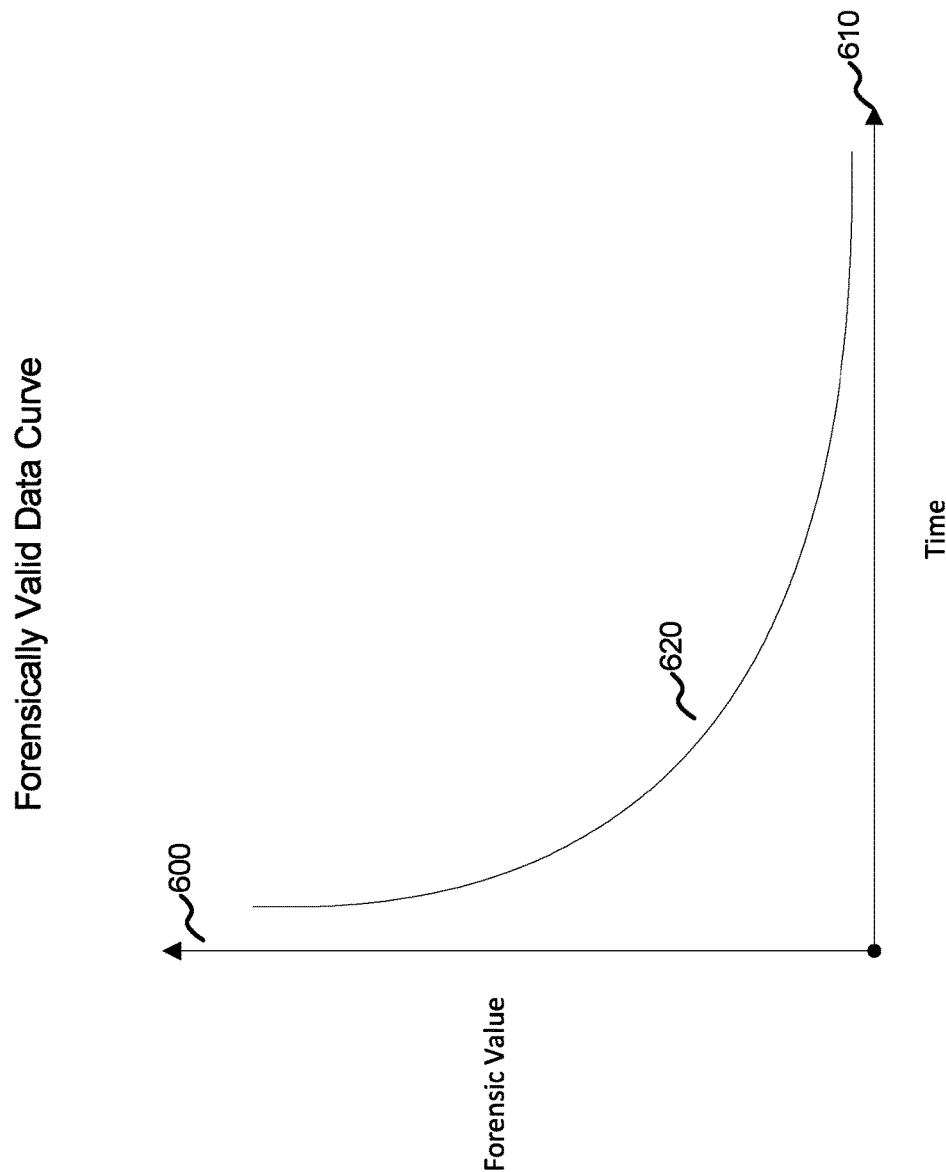
FIG. 6 is a chart showing detail about forensic value of the video data over time.

FIG. 6 Chart of Forensically Valid Data Curve

Please refer to FIG. 6. For a video recording, forensically relevant information is variable over time. When it is first recorded, the information has a very high value. Its value quickly degrades over time until such point as it has little to no value.

OVERVIEW

The present invention provides methods for overcoming the limitations imposed by a finite amount of storage space for a digital recording device. For ease of discussion and not limitation, the following description will describe the current invention in the form of a video recording system as used for surveillance purposes.

The current invention works within the limitations imposed by the system to provide an optimal blend of resolution, frame rate and recording duration for forensically relevant information. Older systems that recorded very grainy video at low frame rates were certainly better than nothing, but did not always provide useful evidence. Forensically relevant information should be able to help law enforcement identify the perpetrator of a crime and any specifics about the crime that may occur within the sight of the recording device. In their quest for longer recording times, the older devices simply threw away too much information.

The current invention deals with the preservation of information in a number of different ways. During normal operation, the present invention records video at its maximum frame rate and resolution. This is either as set by the factory or as set by the user. The amount of time that may be recorded is determined by the size of the mass storage device. For the sake of this discussion, and not limitation, we will assume that the mass storage device is large enough to hold 7 days' worth of this video. After 7 days, the earliest data will be overwritten by newer data, basically using the mass storage device as a large circular buffer. In other devices that use this technique, after 7 days there would be no data available from any time prior to 7 days ago. If it took longer than the 7 days to identify the Recording Camera as relevant, it would simply be too late.

One of the methods that the current invention uses to get around this problem is the use of multiple video streams. While the bulk of the mass storage device is typically allocated toward the current video, the full speed and resolution for the current 7 days, the rest of the mass storage device is reserved for additional data streams. One of the most important types of primary data stream is the reduced frame rate stream.

The preferred embodiment of the current invention has the ability to create at least one additional data stream that contains video with a reduced frame rate. Continuing with the current example, this data stream may contain video that is 4 frames per second, requiring roughly 1/8 of the bandwidth of the primary stream for the same amount of recording time. If 1/4 of the mass storage is reserved for this stream, 14 days of recording would be possible. Like the 7 day stream, this lower frame rate stream is treated as a circular buffer, and data from a time earlier than 14 days will be overwritten by the latest data.

One skilled in the art would appreciate that continuing with this example, a 1 frame per second stream would require 1/30 of the bandwidth of the original stream. Such a stream could be used to greatly extend the storage time beyond the 14 days to 28 days or more. The present invention is not limited to these exact frame rates. Streams with higher and lower frame rates are supported. Additional types of data streams are also supported and will be disclosed in additional detail.

Two methods for overcoming the limitation of a finite amount of storage space on a digital video recording system, to illustrate, and not limit the current invention follow.

One method is by recording two or more different video streams of differing quality. The data of each stream is stored for a different amount of time. To make optimum use of a limited storage device, data from the higher quality video stream is stored for a shorter amount of time than the data from a lower quality video stream.

Another method is to store one video stream. After a set period of time, the least forensically relevant data from the original video stream is modified to be of lower quality thus freeing up storage space.

DETAILED DESCRIPTION

The present invention may be used to increase the amount of forensically relevant information that can be stored by a Recording Video Camera. For a video recording, forensically relevant information is variable over time. When it is first recorded, the information has a very high value. Its value quickly degrades over time until such point as it has little to no value. This idea is illustrated by the graph in FIG. 6. This graph shows a sample as to how the Forensically Valid Data may be weighted over time. It is not meant to limit the interpretation of Forensically Valid Data. In order to understand this concept, a real world example may be in order.

A common problem in retail shopping establishments, such as grocery stores, is the "slip and fall" accident. This type of event happens if a customer falls while shopping. While it could be simply a clumsy customer or even a slippery floor, a large number of these accidents are faked in order to get a payoff from the store's insurance company. A customer making a claim about a slip and fall accident has a limited amount of time to make the claim. For the sake of this discussion, it is one week. In this situation, it is desirable to keep the highest quality video possible for the week in case a claim is made. Once the week is over, the video has less value, as there are fewer claims that could be made for which the video is evidence. As more time goes by, the number of things for which the video could serve as a witness declines. It may never quite reach zero value, as there could be some use for historical information, but its value is greatly reduced over the original one week.

The curve representing the forensic value over time 620 varies depending on the location of the recording device. Different laws, types of crimes, or the nature of the event being monitored can all have an effect on this curve. For this reason, the exact time that the present invention records at various levels of detail may be specified by the user in the preferred embodiment.

As described earlier, the preferred embodiment of the present invention makes extensive use of independent streams of video stored on the long-term storage device. The concept is that the primary stream 400 is stored with as little compression as possible and at the maximum frame rate for the device for the longest time possible given the capabilities of storage device 110. The second stream 410 may store only every other frame of video for time equal or exceeding that of the primary stream. A third Stream may store only every eighth frame 430 in order to further extend the recording time with relatively low storage requirements.

There are a number of different methods for creating the various video streams out of the device's video input. At the present time, long-term storage devices are at a size and price where some form of video compression must be used to store more than a low number of hours' worth of uncompressed video. 1080P30 HDTV class video signals require almost 200 megabytes per second of storage. Not only is this data rate faster than virtually all spinning magnetic hard drives, it would fill a terabyte drive in about 90 minutes if the drive could keep up. Solid state drives are prohibitively expensive for this application, and not ideal due to their limited number of read/write cycles.

Given that video compression of some form will be used, the method used to create additional video streams becomes important from a forensics point of view. Virtually all forms of video compression are lossy, meaning that the resulting video will not have quite as much detail as the original, untouched video from the video imager 120. One method that would allow for the maximum quality of the video in all of the streams derived from the video imager would be to simultaneously generate all of the compressed streams with each new frame of video. In this case, the compression algorithms would have pristine video to work with which will allow for either higher compression ratios or higher image quality of the compressed videos.

The downside to this method is that each of the streams must be stored starting from "now" until the end of the stream time. If the primary stream is to last one week and the second stream two, both weeks of data for the second stream would need to be stored. While this is an efficient and clean method from the point of view of the compression engine 150, it does not make for very efficient use of Storage Device 110.

Another method is to "decompress" the primary stream and use it as an input to another compression stage to create stream two. This is efficient in terms of storage space but will result in a reduction in quality due to the fact that it is working off of an image that has already lost some of its original detail. This may be acceptable as stream two is not as forensically relevant as the primary stream. In order to try and prevent further loss of video quality, there are methods that may be applied during the compression stage.

Video compression techniques, such as MPEG, make extensive use of the fact that nothing much happens from one frame of video to the next. As such, it is efficient to find the differences between frames and compress the difference, rather than simply compressing every frame. When the frames are reconstructed, the loss of quality tends to show as specific forms of "noise" in the video frame. As the nature of the noise is known for each method of compression, steps may be taken to substantially reduce the noise on the reconstructed video stream before creating a new stream out of it.

Another method has to do with the nature of the initial compression itself. MPEG, and some of the other compression techniques in its family, start by compressing a full frame of video. The next frame is then compared to the first frame, the differences noted and the differences compressed and stored. The next frames to be compressed and stored are also difference frames. After a certain number of difference frames, another full frame is compressed and stored. The number of full frames versus difference frames is specified to the compression engine. By setting the period of the full frame compression on the primary stream to match the frame rate that will be used for stream two, stream two can be built using only full frames. This helps insure that the compression engine works with the cleanest possible images.

Regardless of the method used to source the data for stream two, additional image processing steps may be taken to create the cleanest possible stream. One such method is to examine adjacent frames of video in order to determine whether the differences are noise or data. For a scene where there is little to no motion, this technique can dramatically reduce the noise in the frame. For many surveillance applications, the camera is mounted in a fixed position. In many cases, this means that the basic view doesn't change very much. The static portion of the scene tends to be greater than the changing areas. This helps the noise reduction algorithms separate the noise from data.

In a similar manner, there are image processing techniques known in the art that allow a "SuperImage" to be created from multiple adjacent frames of video. In this case, a SuperImage is an image that is at a higher resolution than the original imaging sensor can produce, with additional computed data from the adjacent frames. It is possible when using this technique to create an image that is two or four times the resolution of the original, with a level of detail not possible by pure scaling algorithms.

In order to create the best SuperImage, raw, uncompressed video frames are ideal. The only noise in the frames are those from the image sensor itself. While this is a very high resolution still image, it does have use in the present invention. A slow stream made up of SuperImages, at perhaps one or more seconds per image, is ideal for archival purposes as one of the slowest and longest lasting streams.

It should be noted that even though some recording camera embodiments may be able to switch into a high resolution still mode in order to directly capture a higher than video resolution image, the SuperImage approach allows for a constant data rate that is typically lower than that of trying to intersperse a still photo in a video stream. Additionally, regardless of the video resolution being captured, the SuperImage technique can create a higher resolution still image.

Another technique for creating enhanced resolution images from still photos is a technique proven in a product released by Entropy Engineering, Gaithersburg, Md., in 1997 called ImageBoost. ImageBoost could directly process a frame of video into higher resolution still image without requiring surrounding frames. This was accomplished by doing a "reverse capture" of the original image. Basically, by reversing the digitization process to create a representation of the original analog signal as seen by the image sensors, this analog signal could be resampled at a higher rate, producing a higher resolution image than the original.

These are just two examples of methods that may be used to create one of the typically slower video streams. Other techniques may be more appropriate for specific applications and may be used either in addition or instead of one of these methods. The present invention is not limited to either of these methods of image enhancement.

Figure 2:
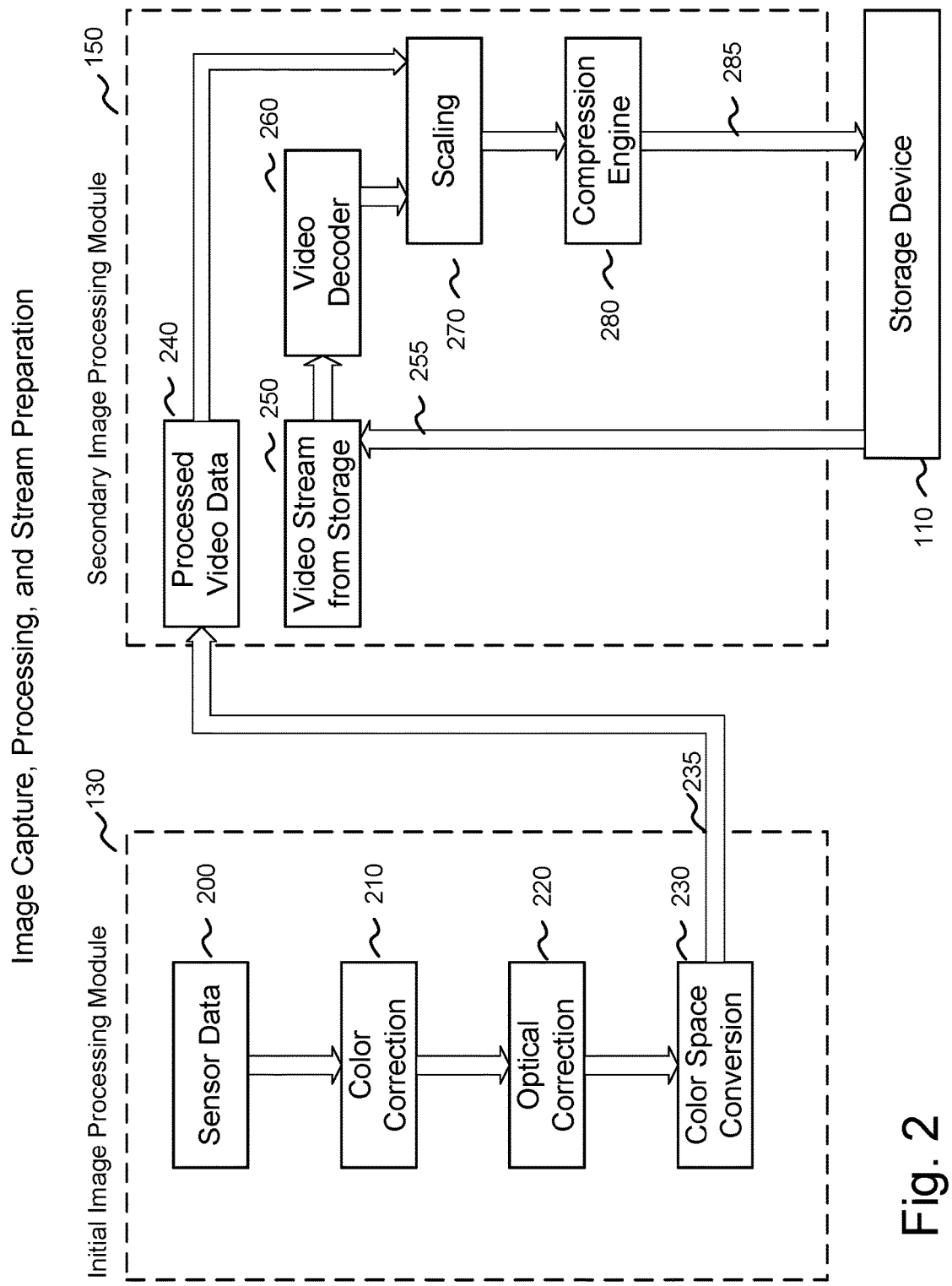
FIG. 2 is a block diagram illustrating one embodiment of the Initial Image Processing and Secondary Image Processing modules of FIG. 1.
Figure 3:
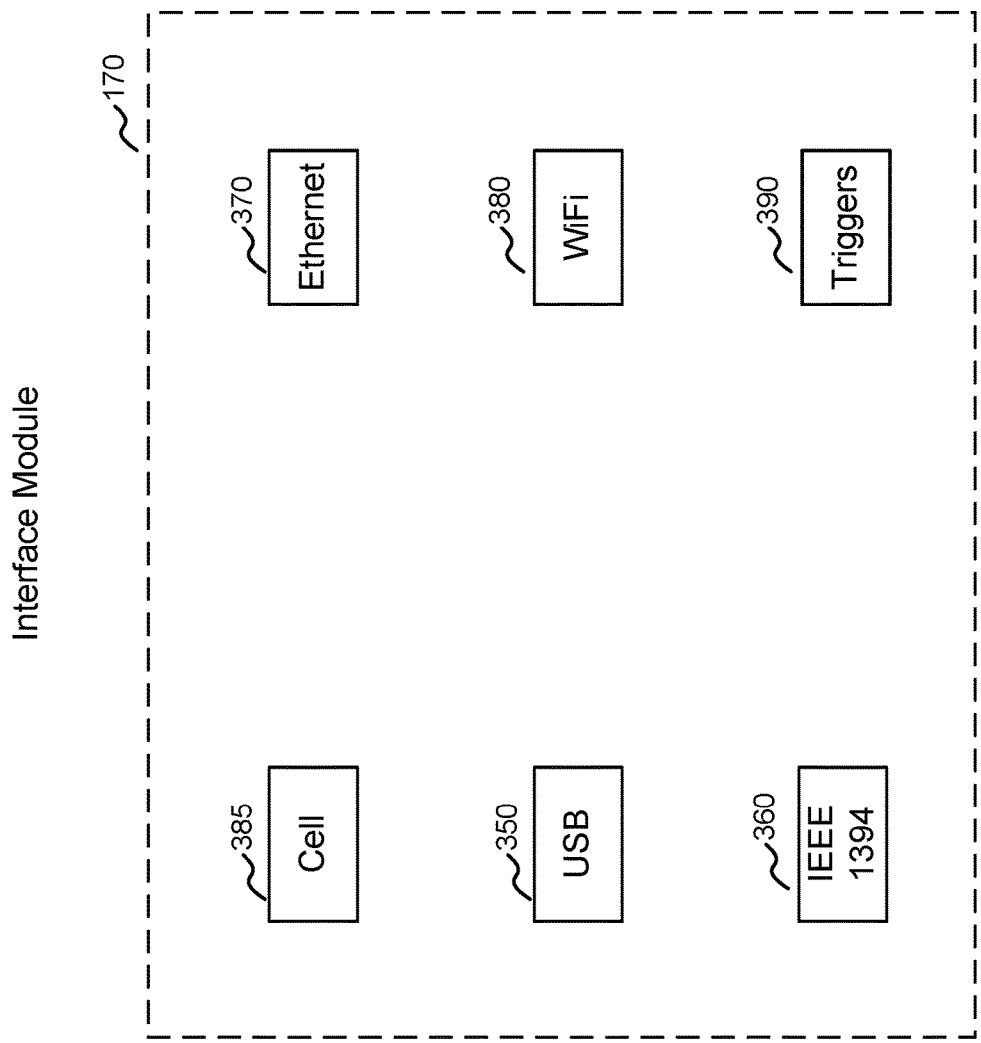
FIG. 3 is a block diagram illustrating one embodiment of the Interface Module of FIG. 1.

FIG. 2 provides additional detail of one embodiment of the process of acquiring images and preparing video streams. The following description is to illustrate but not limit the current invention. Data from a video imaging sensor 200 is Color Corrected in 210. The source of the correction data may be an ambient light sensor 520 that can describe the general color of the light in the room. Different types of lighting, such as fluorescent and incandescent, have different colors that can be corrected out of the video streams.

Optical correction 220 may also be applied to the incoming video. One method for optical correction starts with an image capture of a test pattern. Any aberrations in the captured image are likely due to issues in the optical path. By comparing the captured image with the known reference pattern, a map of the differences between the actual optical path and the desired optical path may be generated. By applying this mapping to the incoming video, aberrations in the optical path may be corrected out.

The last step in the Image Capturing and Processing 130 section is Color Space Conversion 230. This step translates the data format from what is provided by the image sensor to what is required by the compression step 280. It should be noted that in some cases there may be a color correction pass at any step in the conversion process if it simplifies the hardware or coding.

The Processed Video Data 240 is then passed to a video scaling engine 270. This stage compensates for differences in the image subsection. For instance, a 1080P sensor may be used, but the Recording Camera is to be configured for 720P recording. This stage scales the size of the image to fit the desired stream size.

The output of the scaling engine 270 is fed into the Compression Engine 280. This stage takes the incoming video stream and converts it into a compressed video stream, using compression methods such as H.264. The compressed video is then saved to Storage Device 110 as the primary video stream 400.

At the appropriate time, data from the primary stream 400 is read back from the storage device 110. This video stream from the storage device 250 is fed into video decoder 260 which essentially recreates the original video stream. The decoded video stream is then fed into the scaling engine 270 if necessary, and then on to the compression engine to create the next stream 410. This process is repeated for all additional streams that the Recording Camera is configured to create.

Additional Data Streams

The most basic embodiment of the current invention does not require Sensors. Other embodiments of the current invention may include single sensors or various combinations of different sensors.

In addition to the video streams, the present invention may store additional types of data streams that are time synchronized with the video streams. One simple example would be an audio stream 470. Audio is not typically recorded by security cameras, as it is currently prohibited by law to do so in many environments. Adding an audio stream, especially if compressed, would increase the storage per hour requirement by only a small amount.

Other data that might have forensic value could include such things as sensor data. In the case of a recording camera at an outside location watching an intersection, something as simple as a temperature stream could provide valuable forensics data. The local temperature 580 as recorded by the camera could indicate icing conditions at that point. In other embodiments, additional environmental sensors would be added to further characterize the conditions at the specific camera location.

Figure 5:
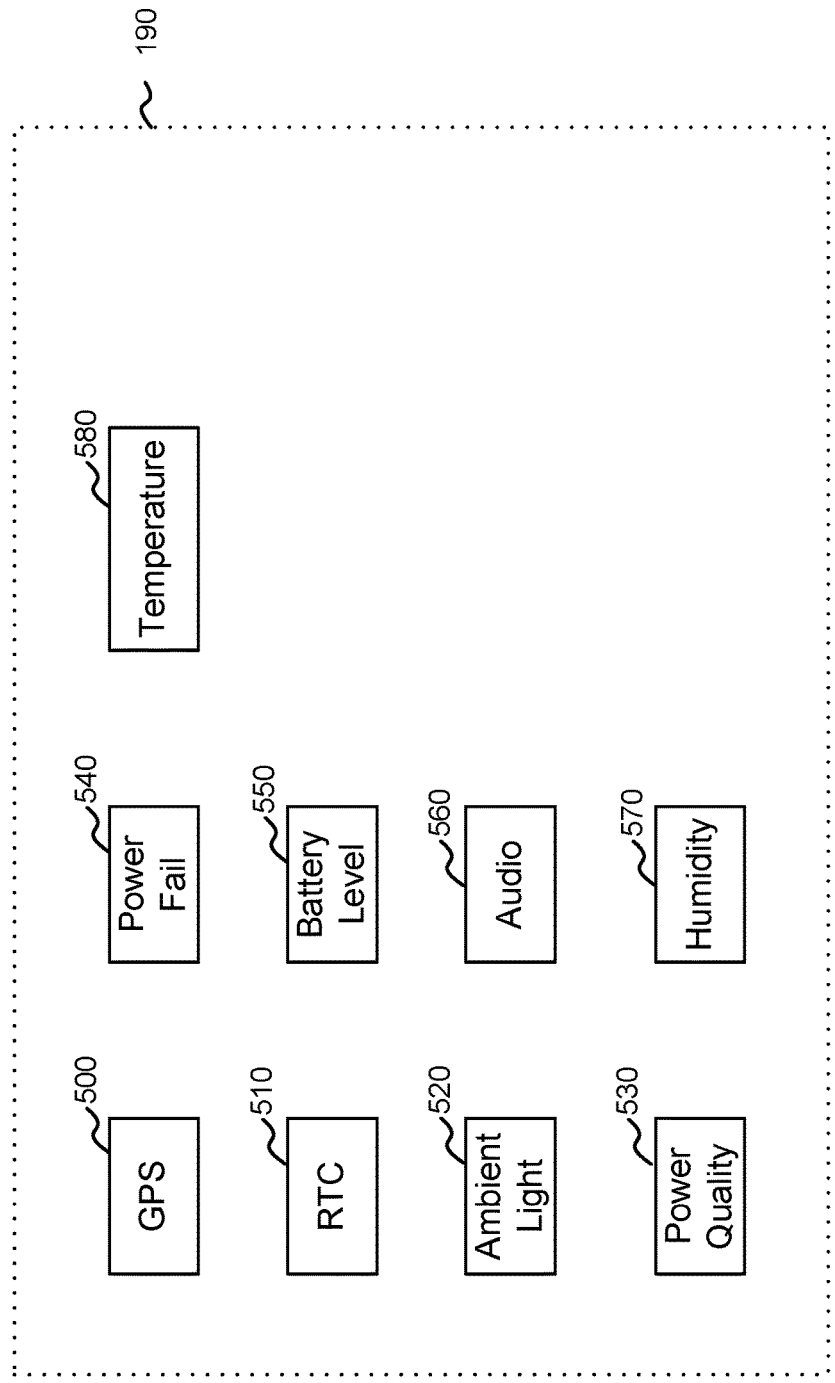
FIG. 5 is a block diagram illustrating one embodiment of the Sensor Module of FIG. 1.

Data streams such as these require very little bandwidth compared to the main video streams. Temperature and environmental sensors for a fixed location change fairly slowly, and would typically only need to be sampled in a time frame measured in minutes. FIG. 5 shows a number of the different sensor options for the preferred embodiment. A real-time clock 510 can give an accurate time and date reference for the captured video. While an ambient light sensor 520 can help the camera determine the optimal video settings, it can also serve as an alert that something has radically changed in the environment.

Power monitoring serves a couple of different functions. Power quality monitoring 530 can indicate that the location has switched to a back-up power source or that a power fail is highly likely to occur in the near future. Similarly, a power fail monitor allows an embodiment with its own back-up power source make intelligent decisions about its power use. A power failure may simply be a power failure, but could also indicate an event is about to happen. Given that there would be a finite amount of power left for recording, the Recording Camera could optimize its power usage in a number of ways.

One method would be to temporarily suspend the maintenance of multiple video streams, initially focusing on the maintenance of the highest quality video stream. If power were not restored in a timely fashion, the recording camera could switch to creating a lower bandwidth stream in order to further optimize its remaining power. Any other on-board features whose power can be controlled would also be powered down if not absolutely essential for low power operations. For instance, without power, most internet access methods would not be available, so there would be no reason to keep an Ethernet port 370 powered up.

The assumption is that if there is a power failure, it could be intentional. In such a case, the goal of the power conservation methods is to insure that all activity possible is recorded by the camera.

Specialized audio sensors 560 can be used to identify certain types of sounds, such as glass breaking and gunshots. An audio sensor could also be used to record audio, where applicable.

A humidity sensor 570 can help indicate an environmental change, such as flooding. Taken together, the sensor data synchronized with the video data can build a complete picture of the environment described by the video streams.

So far the discussion has focused on streams that are created on a fixed schedule as set by the design and/or the user. Another type of stream that may be implemented is the Area of Interest (AOI) stream. This is not a time locked stream like all of the others, but is rather an extract of other streams that is stored for future review. Generally, an AOI stream is created when the present invention detects a condition that warrants special attention to video that has already been stored or about to be stored.

As an example, it is known in the art how to detect the sound and direction of a gunshot. If the recording camera were equipped with this ability, upon detection of a gunshot, the process to create an AOI stream is started. The AOI stream would be made up of the highest resolution and highest frame rate video available for both a period of time leading up to the event and a period of time after the event.

A certain amount of storage would be allocated for AOI streams on the storage device. If the space is exceeded, AOI streams would typically be deleted in an oldest first fashion. Additional rules for the deletion of AOI streams can be implemented in such a way that the system cannot be spoofed into deleting forensically relevant data.

In certain embodiments, the AOI could be implemented as a pointer to an existing data stream, rather than a full stream of its own. It would also have its own rules for the processing, storage, or deletion to the of the AOI data.

Additional Embodiments

While the discussion so far has been focused on the preferred embodiment of the invention, the invention is by no means limited to the preferred embodiment.

For instance, there are many other types of sensors, beyond what has already been discussed, that could augment the functionality of the present invention. For example, in an embodiment of the present invention that has the ability to pan and or tilt and or zoom, the addition of sensor data that describes the physical configuration as represented by these abilities is forensically valuable information. If available, this data would typically be stored in the sensor stream.

Similarly, especially for outdoor applications, a magnetic field sensor, such as a compass, provides forensically relevant data as it describes the primary direction of the field of view of the present invention.

Beyond what has already been described, additional information as to the health of the present invention may be ascertained by reading SMART data from the storage device, if the storage device provides such information.

Some embodiments may allow the user to connect the present invention to a PC for the purpose of reading data from its long term data storage device. This connection may be made by a physical cable to the device, or wirelessly. The preferred embodiment simply calls for the user to remove the storage device to access the data from another device. By removing the storage device, no further changes to the forensically relevant data would be made. Additional precautions would typically be taken to preserve the data on the long term storage device, such as protecting it from changes by the computer trying to read it. Preferred methods for this type of protection may be found in U.S. Pat. No. 6,813,682. As part of the Recording Camera system, a specialized computer compatible reader that incorporates protection for the long-term storage device may be provided. This additional device could also provide data translation of the Recording Camera's internal data format into a standard, PC compatible file system for ease of analysis, should they differ.

In yet another embodiment, it may be desirable to retrieve occasional images from the current invention. By taking advantage of the Scaling 270 and Compression 280 capabilities, images may be created on demand for the desired target device, such as a smartphone.

In another embodiment, the Recording Camera may send notification to a user through one or more of its communications channels that an event has occurred of which the user might be interested. An image may be sent along with this communication if desired.

In another embodiment, the current invention may make use of laser communication techniques to provide a line of sight, protected communication channel. For example, an undercover police officer may prefer not to be seen on video for a specific amount of time. Using a laser communication device, the officer could establish a connection to the Recording Camera to modify its settings. While any of the wireless methods could be used to communicate with the device, all of the standard methods are far more prone to eavesdropping and interception.

In another embodiment, the present invention may perform image processing on the captured video for a number of purposes. A typical example would be for a Recording Camera to be placed near a road. Using Optical Character Recognition (OCR) techniques that are well known in the art, it could read license plates that passed through its field of view. The results of the OCR pass would be a low bandwidth stream that could be stored in a time synchronized fashion with other data on the long-term storage device and/or sent to another device.

In a similar fashion, image processing may be applied that would attempt facial recognition on any people that enter the field of view of the Recording Camera. The results of the facial recognition algorithm could be immediately checked against a local database for high profile individuals. Other databases could be checked if the device had an active communications channel to another system.

As the ability to perform image processing tasks on board the current invention provides certain advantages to post processing the data, another embodiment expands on these abilities. This embodiment provides one or more physical connection points for a user to plug in $3^{rd}$ party code modules. These modules would contain program code and data that could add functionality to the camera. By following the programming rules and techniques as specified by the device manufacturer, features could be added to the Recording Device that were not originally designed in by the manufacturer. Physical embodiments of software allow for physical security to be implemented against software piracy, which aids in the growth of a third party market.

Similarly, another embodiment would allow for third party software to be uploaded directly to the present invention. Once again, all of the programming rules would have to be followed for such code, and the present invention would have certain protections against flaws in the third party code.

Wireless Data Transmission Embodiments

In another embodiment, the present invention may be configured with a wireless data transmission channel, such as WiFi. Using the wireless link, a number of additional capabilities become possible. Configuration information may be transferred without a direct wired connection.

In another embodiment, the recording camera would present a web based interface to a standard browser that would allow a user to check settings, change settings, and in certain embodiments, receive images from the recording camera. An app for a PC or mobile device may also be provided for additional control of the recording camera.

In another embodiment, the current invention may transfer some video information through one of the interfaces, including the wireless one. For the sake of clarity, we will discuss some of the options presented by the wireless connection. When transferring video, the current invention may have the ability to transfer partial streams, single frames, full streams, or even all streams. Using the wireless capabilities, PCs and portable devices may be able to view portions of the video data. Bandwidth limitations and processing power limitations on the recording camera may set a limit on the amount of video that may be viewed through a remote device. Additionally a user viewing video data remotely may be able to issue instructions to the recording camera, such as special processing instructions or annotations to the video data. A user may also request additional data from the digital video recording system.

For example, the current invention may be set to send a user notification when Audio Sensor 560 detects a noise over a certain level. The user may request the current invention for additional data, such as the audio sound which caused the notification, video, still images, etc.

In another embodiment, the current invention is paired with an external Recording Receiver. The recording receiver is optimized to receive streams from one or more recording camera. While the recording camera is self-sufficient, there are cases where it would be beneficial to store one or more streams in a remote unit. The recording receiver is not intended to be a replacement for the on-board storage of the recording camera, but rather a method to augment its capabilities. Referring to FIG. 1, in this embodiment the Communication Module 175 would include Wireless Data Transmission and perhaps receiving capabilities. Additionally there may be a link between the Initial Image Processing Module 130 and the Communication Module 175 and there may be a link between the Secondary Image Processing Module 150 and the Communication Module 175. Decision Module 140 determines what video data is sent to Communication Module 175 and from there to an external recording receiver 700.

The external recording receiver receives video data from the recording camera in the Communications Module 775. Decision Module 740 determines if the data is to be stored directly in the Storage Device 710 and/or to be further processed in the Secondary Image Processing Module 740 and then stored in Storage Device 710 or both. In other aspects Decision Module 740 operates similar to Decision Module 140. However Decision Module 740 may have different presets than 140. Additionally Storage Modules 110 and 710 may have different storage capabilities, thus what is stored on 100 and 710 may be different.

The Recording Receiver 700 may be set to record a relatively low data rate stream. This allows for remote viewing of the data. Additionally, the recording receiver may receive data from multiple recording cameras. This would allow a single point of access for the review of multiple data streams.

Wireless transmissions are always prone to interference and even intentional jamming. This is a limitation of traditional wireless cameras and other wireless computing devices. With its on-board storage, the recording camera is not prone to interference in this manner. A recording receiver may serve as a convenient or accessible backup to the recording camera's own storage. Additionally a recording receiver may have a larger storage device, thus allowing it to store higher quality video data for longer periods of time.

There are wireless cameras on the market, but they are essentially remote imagers and not recording devices In a further embodiment, the recording receiving device may be implemented as an application for a personal computer or other computing device.

No element, act, or instruction used in the description of the present application should be construed as critical or essential to the invention unless explicitly described as such. Also, as used herein, the article "a" is intended to include one or more items. Where only one item is intended, the term "one" or similar language is used. Use of "him" or "her" are not gender specific an applicability to one gender or another of any feature or claim of this invention is not intended.

The above specification and examples provide a complete description of the structure and use of exemplary embodiments of the invention. Many embodiments of the invention can be made without departing from the spirit and scope of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A digital video recording system that optimizes storage of forensically relevant video streams on space limited storage media comprising:
   a video imager;
   a storage device;
   an initial image processing module connected to the video imager and the storage device configured to process data from the video imager;
   a secondary image processing module connected to the initial image processing module, the storage device and a decision module configured to modify the quality of the video;
   a decision module connected to the initial image processing module, the secondary image processing module and the storage device, said decision module configured to issue commands for processing video data and issue commands to modify data on the storage device such that the most recent video data is stored at a high quality, while older video is stored at a lower quality as it ages.

2. The digital video recording system of claim 1 wherein two or more video streams of differing quality are created from the same video data and the decision module modifies the data on the storage device by issuing commands to eliminate a portion of the oldest, highest quality video data as necessary.

3. The digital video recording system of claim 1 wherein the decision module modifies the data on the storage device by issuing commands to direct a portion of the video stream to the secondary image processing module for additional processing to reduce the quality of the that portion of the video stream.

4. The digital video recording system of claim 1 further configured to create and store SuperImages created from the video data.

5. The digital video recording system of claim 1 further comprising a sensor module connected to the decision module and/or the storage device.

6. The digital video recording system of claim 5 further configured to add data from a sensor to a video stream.

7. The digital video recording system of claim 1 further comprising a communication module and one or more interfaces, the communication module connected to the decision module and the interface(s).

8. The digital video recording system of claim 1 further comprising a sensor module and a communication module and one or more interfaces.

9. The digital video recording system of claim 8 wherein the sensor module includes an audio sensor.

10. The digital video recording system of claim 7 wherein one of the interfaces is a USB interface.

11. The digital video recording system of claim 7 wherein one of the interfaces is a WiFi interface.

12. The digital video recording system of claim 7 further comprising an external recording receiver.

13. The digital video recording system of claim 5 further configured to save a portion of the video stream as high quality based on input from a sensor.

14. The digital video recording system of claim 1 further comprising the video imager has pan, tilt and/or zoom capabilities.

15. The digital video recording system of claim 1 further configured to save pan, tilt and/or zoom information along with the video stream.

16. The digital video recording system of claim 11 further configured to send notification to a user based on sensor data.

17. The digital video recording system of claim 11 further configured to allow a user to view selected portions of a video stream.

18. The digital video recording system of claim 1 further comprising optical recognition capabilities.

19. The digital video recording system of claim 18 wherein the optical recognition capabilities includes facial recognition.

20. The digital video recording system of claim 1 further comprising a case that encloses all elements.

21. The digital video recording system of claim 1 configured without an Initial Processing Module wherein the Video Imager is connected to the Secondary Processing Module and the Storage Device.

* * * * *